Aug. 8, 1961 P. W. KLOOZ 2,994,952
FORGING PROCESS
Filed Aug. 29, 1955 2 Sheets-Sheet 1

INVENTOR.
Paul W. Klooz

Morgan, Finnegan, Durham & Pine
ATTORNEYS

Aug. 8, 1961  P. W. KLOOZ  2,994,952
FORGING PROCESS
Filed Aug. 29, 1955  2 Sheets-Sheet 2
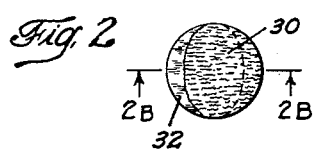
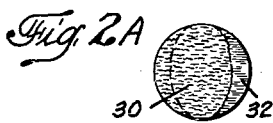
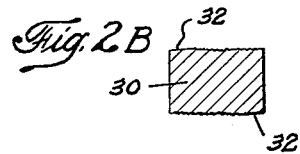
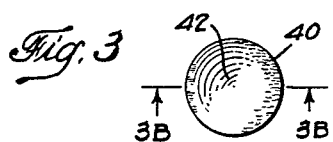
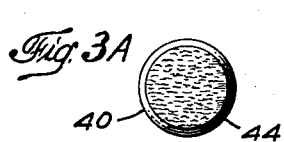
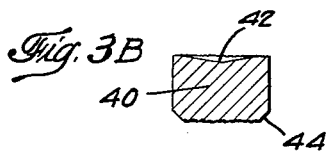
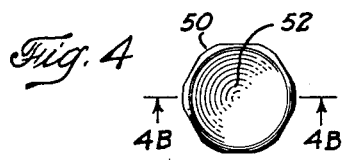
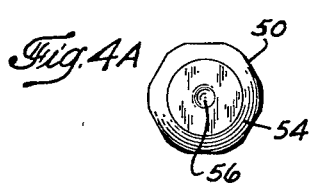
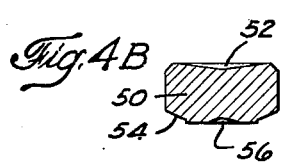
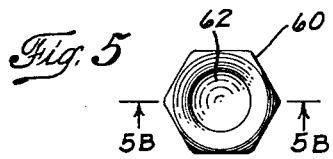
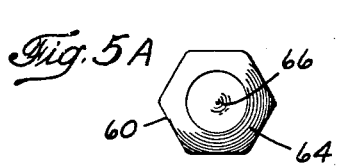
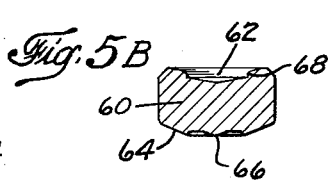
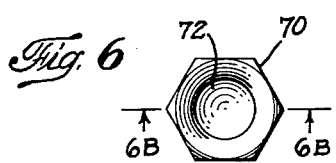
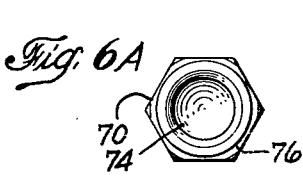
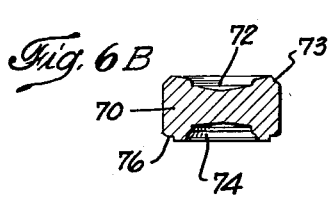
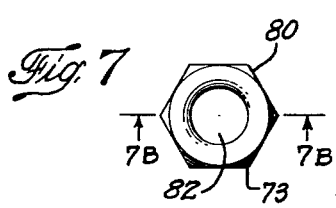
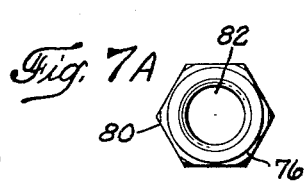
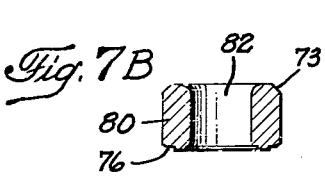
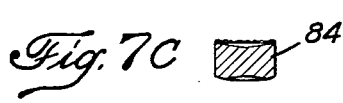
INVENTOR.
PAUL W. KLOOZ
BY
Morgan, Finnegan, Durham & Pine
ATTORNEYS.

United States Patent Office

2,994,952
Patented Aug. 8, 1961

2,994,952
FORGING PROCESS
Paul W. Klooz, % The Holo-Krome Screw Corp., West Hartford, Conn.
Filed Aug. 29, 1955, Ser. No. 531,178
6 Claims. (Cl. 29—552.3)

The present invention relates to a novel and improved process for the forging of blanks for the production of nuts, ball races and similar pierced or punched articles.

Objects and advantages of the invention will be set forth in part hereinafter and in part will be obvious herefrom, or may be learned by practice with the invention, the same being realized and attained by means of the steps, process and compositions pointed out in the appended claims.

The invention consists in the novel steps, process, compositions and improvements herein shown and described.

The accompanying drawings, referred to herein and constituting a part hereof, illustrate one form of apparatus for carrying out the process of the invention, and together with the description, serve to explain the principles of the invention.

Of the drawings:

FIGURE 2 is a top plan view of slug as it is cut from a length of warmed wire stock as the initial step in the process of the present invention;

FIGURE 3 is a top plan view, but of the other side of the blank, after it has been reversed and subjected to the first operation, sometimes referred to as "squaring";

FIGURE 4 is a top plan view, of the first side of the blank after it has again been reversed and subjected to a further forming operation, often referred to as "sizing";

FIGURE 5 is a top plan view of the second side of the blank after it has again been reversed and subjected to a "doming" operation;

FIGURE 6 is a top plan view of the first side of the blank after the blank has again been reversed and subjected to the "hexing" operation;

FIGURE 7 is a top plan view of the first side of the blank after the blank has been transferred to another forming station and has been subjected to the "piercing" operation;

FIGURES 2A, 3A, 4A, 5A, 6A and 7A are bottom plan views of objects shown in the respective top plan figures;

FIGURES 2B, 3B, 4B, 5B, 6B and 7B are cross-sectional views of the objects shown in the respective views; and FIGURE 7C is a sectional view showing the waste piece formed by the piercing operation.

Figure 1:
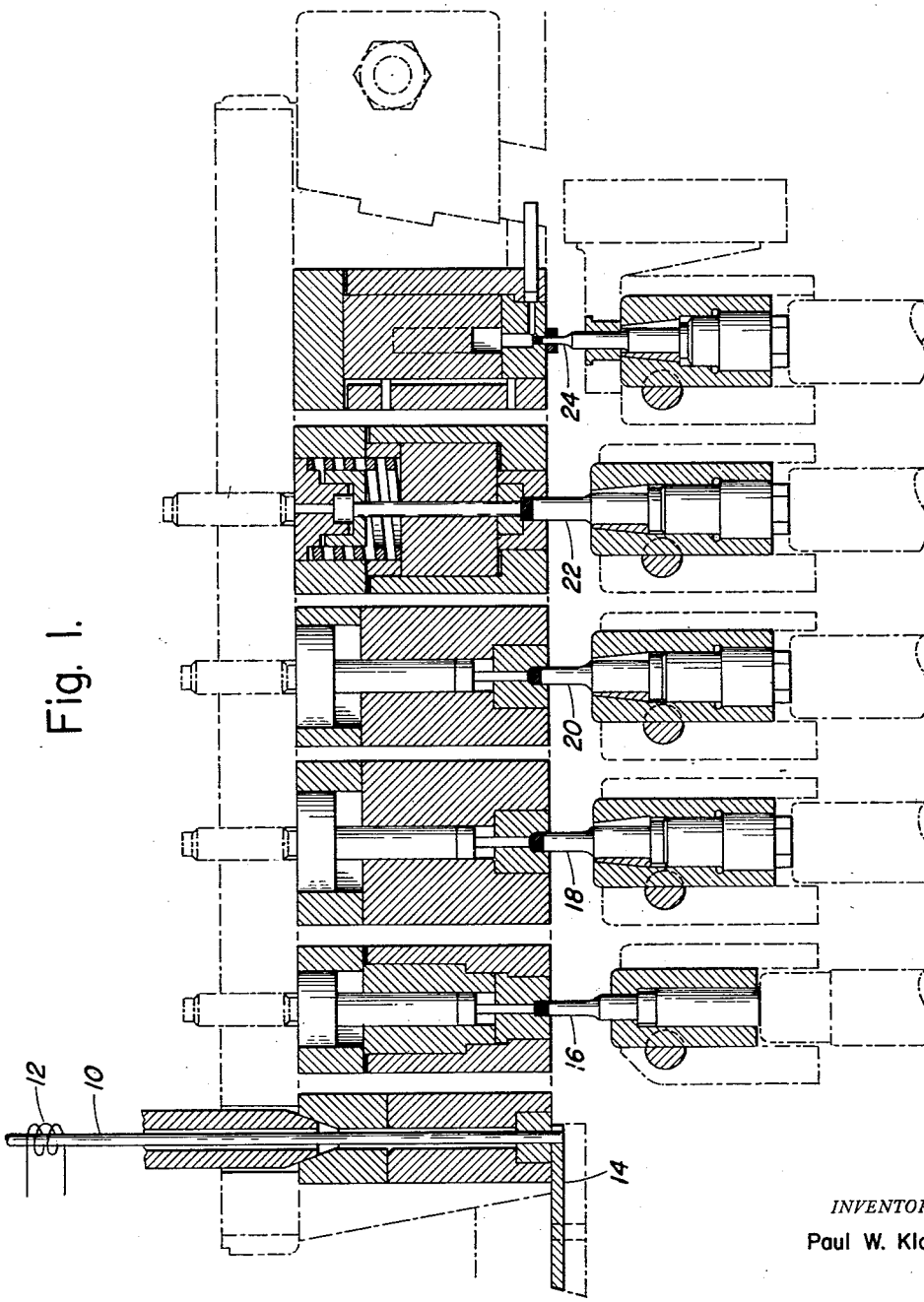
FIGURE 1 is a schematic sectional view showing an apparatus with its successive stations by which the process of the present invention is conveniently and preferably put into practice.

The present invention has for its object the provision of a novel and improved process for the formation by cold forging techniques of a blank for a nut, ball race or other similar pierced article which is formed to have a definitely shaped exterior and a pierced-through punched-out interior. A further object is the provision of a novel and improved process for the formation of nut-blanks, ball race blanks and the like, by modification of cold-forging techniques, which results in the formation of a superior and more accurately shaped blank, at the same time that the die life of the forming dies is greatly increased, thereby greatly reducing the cost of producing such blanks. Still another object is the provision of a novel and improved process by which blanks of a larger size can be formed and produced on a given piece of forming equipment, compared with the size of blanks which can be produced without utilizing the process of the present invention. An added advantage of the process of the present invention is the fact that blanks can be produced in accordance with the process of the present invention on a given piece of equipment at a much higher rate of production than is otherwise possible. All of these factors combine in the preferred manner of carrying out the process of the present invention so that the overall cost of producing such blanks, and similar articles, is often less than half of the cost of producing them by the conventional process on the most advanced equipment.

Specifically, the process of the present invention comprises an improvement upon the process of forming nut blanks and similar articles, such as ball bearing races, and other cold-forged articles (as distinguished from headed articles such as socket screws, bolts and rivets) on cold-forming or cold-forging equipment such as the "Waterbury" automatic nut former in which a blank or slug is cut from a length of wire stock, is then subjected to successive forging or forming operations in a succession of forming dies, and is finally subjected to a piercing-through or punching-out operation, which, in the formation of such blanks causes the work piece to be completely pierced to form the aperture which may then be threaded.

A further improvement according to the present invention according to one specific manner of carrying out the process, results in a reduction in the number of forming steps required for forming the finished blank from the slug, and in many instances some of the conventional operations may be omitted as separate steps, with a consequent further reduction in the cost of the necessary equipment as well as a recurrent reduction in the cost of the dies which must be provided for each separate form of blank to be produced and must be replaced every few days in continuous production of a particular form of blank.

By practice of the present invention, nut blanks and other pierced-through or punched-out articles similar thereto, can be completely cold-forged from alloy and medium and high carbon steels and other cold-forgeable ferrous metals with their exterior surfaces accurately formed and at a high rate of production, with exceedingly long die life, by warming the stock just prior to the forging operations and by controlling the temperature of the work piece throughout the forging operation so that it does not exceed a predetermined maximum temperature, such temperatures in excess of the maximum causing excessive breakage of dies, and also impairing the accurate formation of the desired blanks.

According to a further extension of the invention, the slug is subjected to the action of a piercing punch while it is warmed to the temperatures set forth and while the slug is supported in a forming die, the piercing die serving to move the metal of the slug away from the piercing punch in a direction radial to the punch and often axially of the punch so that the central aperture is accurately formed, and the partially formed blank is expanded while supported in the die, thereby also avoiding excessive waste due to a large punch-out portion.

The process of the present invention is characterized by the warming of the wire or rod stock to a moderate degree prior to the cutting off of the slugs from the wire or rod, and by the control of the temperature in such a manner that considering the rate at which the process is carried out, the volume of metal displaced during the forging or forming operation, the heat transfer characteristics of the apparatus used for the process and the size of the parts being produced, the temperature of the slug during the successive steps of the process does not exceed a predetermined maximum of 650° F. and preferably not in excess of 600° F.

The initial heating of the wire or rod stock is preferably to a temperature of at least 150° F. and usually in excess of 200° F., while at the conclusion of the forming or forging operations the slug which has been completely formed into a nut blank is preferably at a temperature of from 450° to 600° F., or less preferably below a maximum temperature of 650° F. The gain in temperature beyond the temperature to which the rod or wire stock was initially heated prior to the forging or forming operations is caused by the working of the metal, and the faster the metal is worked, the greater the volume of metal pushed around during the forming operations, the less heat transferred from the metal during the forming or forging operations and the more refractory the ferrous metal, the greater will be the rise in the temperature of the metal during the process. Thus, in case the metal is being heated to too high a temperature, it will be necessary to reduce the speed of operation or otherwise compensate for the increase in temperature so as to hold the temperature of the partially formed slug below the maximum temperature of 600° or 650° F.

While the heating may be carried out by any conventional means, it is preferably carried out by subjecting the wire or rod fed to the cutting-off and forming operations to a high-frequency heating apparatus comprising a water-cooled coil surrounding the feed stock, the coil being supplied with the appropriate amount of power, such as 5 to 10, 15 or more kva. and at a frequency of from 500,000 to 2,000,000 c.p.s. or more. With such an amount of power a wire of alloy steel, having a diameter of about ¾" and suitable for the formation of a standard nut blank to fit a ½" bolt may be fed at the rate of 100 or more slug lengths per minute and initially heated to a temperature in excess of 200° F.

The power may be continuously supplied to heat the wire or rod stock or may be operated intermittently in time with the feed of the stock, and in any event, is preferably discontinued wherever the feed of stock is discontinued for any substantial period of time.

Where only a small proportion of the metal is to be moved during the nut-forming operation, it may be necessary to heat the wire to temperatures as high as 350° F. and in the case of some ferrous alloys, it may sometimes be desirable to have the initial heating to a temperature as high as 400° F., but in no case will the temperature of the nut-blanks after they have been fully formed exceed 650° F. and the final temperature is usually kept to a maximum of 600° F.

After the nut-blanks have been fully formed, they are then ready for threading and such heat-treatment as may be required.

It will be understood that the foregoing general description and the following detailed description as well are exemplary and explanatory of the invention but are not restrictive thereof.

Referring now in detail to the accompanying drawings, there is illustrated the present preferred manner of carrying out the process of the present invention, and as illustratively shown the nut blank is fully formed from wire stock in six stages, although a smaller or a larger number of stages may be used depending upon complexity of the work, the relative amount of the metal to be moved during the forming operation and the capacity of the forming apparatus on which the process is to be carried out.

In FIGURE 1 is shown a schematic horizontal section of a Waterbury-Farel automatic nut forming machine of known construction which is adapted to perform the operations of cutting off the slug from the steel wire or rod feed stock, squaring, sizing, doming, hexing and piercing. The feed stock, comprising steel wire or rod 10 enters the machine at the upper left of the figure and is fed through a high frequency, water-cooled, induction heating coil 12 where it receives a sufficient amount of high frequency power at a frequency of from 500,000 to 2,000,000 c.p.s. or more, and preferably at about 1,000,000 c.p.s., to cause the wire or rod feed stock to be heated to the desired temperature in excess of 200° F., preferably about 250° F.

The first operation is the cut-off operation which is accomplished by the cut-off knife 14 which cuts off a slug of the proper thickness for the proper size of wire to form the finished nut blank without excess material being provided.

The cut-off slug is then transferred, by transfer fingers not shown, to the squaring station where a squaring punch and die 16 are provided to square the front and back faces of the slug.

The squared slug is then transferred to the sizing station where a further punch and die set 18 exerts powerful and sudden pressure on the slug and causes it to be slightly enlarged in diameter and further modified in the shape of its faces.

The sized slug is then transferred to the doming punch and die set 20 which causes one face of the slug to be domed, or provided with a recess extending over a major portion of one face of the slug, and the slug assumes an approximate hexagonal shape.

The domed slug, after again being transferred is subjected to the pressure and forming action of the hexing punch and die members 22 which cause the steel to be formed accurately into the die which has a hexagonal concavity corresponding to the hexagonal shape desired in the nut, and is also provided with a recess on its other side.

Thereafter the hexagonal-shaped slug with a recess on each of its sides is subjected to the piercing or punching-out operation, during which the slug is supported in a suitable die, and the piercing punch 24 accurately punches out the central hole of the proper size to provide for the threads which are to be formed as a final stage in the formation of the nut.

In case other forms of objects than hexagonal nut-blanks are to be formed, the dies will be correspondingly modified. Not shown, are the conventional transfer means by which the partially worked slugs are transferred from one station to the next, but with the illustrated form of apparatus for the production of a hexagonal nut blank, the transfer means for transferring the slug from one station to the next preferably cause the nut blank to be revolved between each station, except the last, so that first one side and then the other is adjacent and worked by the corresponding punch member. However, between the hexing and the piercing stations, the almost completed slug is transferred without being revolved.

In FIGURES 2, 2A and 2B the cut-off slug 30 is shown with its deformed edges 32 on opposite sides of the slug resulting from the cutting action of the knife 14.

After the slug 30 has been squared by the action of the punch and die set 16 it has the general shape shown in FIGURE 3. Here the squared slug 40 has a slight concavity 42 on the face adjacent the punch, and the edges of the slug are bevelled or champfered, as at 44, by the action of the die of the set 16.

After squaring, the slug 40 is turned over and subjected to the sizing operation by the punch and die set 18 and the resulting sized slug 50 has the appearance shown in FIGURES 4, 4A and 4B. Sized slug 50 is slightly larger in diameter than it was after squaring, and the punch side of the slug 50 is formed with a concavity 52, while the die side is bevelled or champfered, as at 54. The former concavity 42 has almost disappeared and remains only as a small depression 56 in the die side of the slug.

The sized slug 50 is then again turned over and subjected to the doming punch and die set 20 and when this operation is finished the domed slug 60 has the appearance shown in FIGURES 5, 5A and 5B. The domed slug 60 has assumed a generally hexagonal shape due to the radial flow of metal caused by the formation of the punched recess 62 causing the slug substantially to fill the hexagonal die of set 20.

The slug 60 is slightly champfered on the punch side from the previous operation and the die side is distinctly champfered, as at 64. On the die side, there is usually an insignificant boss or dimple 66 which results from the tendency of the metal to flow axially, rather than radially. The recess 62 preferably has a generally concave bottom and relatively cylindrical sidewalls 68, but the exact shape of this recess is of minor importance so long as the recess is of substantial depth.

The domed slug 60 is then rotated and transferred to the hexing punch and die set 22 from which it emerges as the hexed slug 70 of FIGURES 6, 6A and 6B. In this step the further axial compression of the steel slug warmed to a temperature less than 600° F. or 650° F. causes a further radial flow of the metal as it is seated in the hexing die, thereby accurately forming the hexagonal exterior of the slug 70. In this operation, the punch forms a deep recess 72 on the punch side of the blank without completely destroying the recess 74 which had been the recess 62 of the previous step.

The hexing die also serves to form the stepped and bevelled edge 76 of the slug 70, the exact shape of the edge 76 being determined at will by the shape of the die.

The fully hexed slug 70 is then ready for piercing-through and the slug is transferred, without rotation, to the piercing punch and die set 24 for this operation. The punch pierces a suitably diametered cylindrical hole through the hexed blank to form the pierced blank 80 which is a completed nut blank ready for threading, heat treatment and any other desired operations.

The finished blank 80 preferably retains the bevelled edges 73 and 76 and differs from the hexed blank 70 in that it is provided with the pierced-through hole 82, and that the waste piece 84 has been removed (FIGURE 7C).

While the operation has been described as comprising six steps, it is often possible to combine various steps so as to eliminate the separate squaring step, as well as the doming step, so that the completed blank may be formed, at temperatures ranging between 200° and 600° or 650° in as few as three or four steps.

Ball bearing races and similar objects may be produced in accordance with the process of the present invention in as few as two operations following the cut-off of the slug from the feed of wire or rod steel warmed to an initial temperature of at least 150° or 200° F. and never exceeding 600° or 650° F. during the forging or forming process.

The cut-off slug, heated to the proper temperatures within the limits given, usually about 250° F. is first subjected to a sizing operation which radially expands the slug to the desired size while it is supported in a die of the proper size and is subjected to the extreme deforming pressure of a punch. As the next and final step, the slug is allowed to remain in the same die and is then subjected to a second punch which penetrates through the central portion of the slug and forms the square, round, hexagonal or other polygonal aperture therein, at the same time accurately conforming the slug to the die so as to form the finished blank. For ball bearing races, the raceways would be finished by grinding.

In accordance with a modified manner of carrying out the process of the present invention, which is especially adapted to achieve the previously described advantages of the present invention, and also to reduce and substantially eliminate the waste caused by the punching-out of the central aperture of the blank. In accordance with this modification, the slug is cut from the bar or wire stock in the conventional manner, after which the warmed slug, heated to a temperature in excess of about 200° and yet not so high that the maximum temperature during the forging process will exceed 600° or 650° F. The length of the slug is preferably slightly shorter and slightly smaller in diameter than the blank to be formed, and the mass of the slug is preferably only slightly larger than the mass of the blank to be formed by the forging operation.

The slug is then positioned and seated in a die similar to the die of die set 20, except that it is provided with a relatively small central aperture, and the cooperating punch is provided with a leading end of relatively small size which gradually tapers to a larger diameter, approximating the diameter of the hole eventually to be formed. As the tapered punch penetrates the slug, a small aperture is formed therein, which hole is gradually enlarged as the punch progresses into the slug, the progressively increasing diameter of the punch gradually expanding the slug or partially formed blank so that it substantially or fully fills the die within which it is seated. The piercing punch is then withdrawn, and the pierced-through slug is turned over and again seated in the same die or in a further die which has the final desired shape of the blank, and is again entered by a slightly larger punch which causes the pierced slug or partially formed blank to be expanded axially to the desired dimension, while the blank is also expanded slightly in its radial direction so that its exterior dimension is accurately formed in the die and the blank is thus finished as a completed nut-blank, ball-bearing race or other object ready for such further machining and heat-treating operation as may be required.

Of course, the radial expansion function of the piercing die may be varied so as to be subsequent to the axial expansion of the slug, in which case the slug would be first positioned in one die and then in another die of a slightly larger diameter. In the first die the slug would be radially confined so that its flow would be mainly axial, while in the second die the axial compression of the metal between the punch and die faces would cause radial expansion of the metal so as to accurately shape the exterior of the blank.

The invention in its broader aspects is not limited to the specific steps, process and compositions shown and described but departures may be made therefrom within the scope of the accompanying claims without departing from the principles of the invention and without sacrificing its chief advantages.

What is claimed is:

1. The process of forging an apertured steel blank which comprises heating a steel slug to a temperature between 150° F. and 400° F., subjecting said heated slug to at least two successive punch and die operations which cause the steel to flow radially and axially of the punching pressure, one of said operations including piercing the slug to form an aperture therethrough, and maintaining the temperature of said blank above 150° F. and below 650° F. during the punching operations, said steel being of a type not adversely affected by the punching operations.

2. The process as defined in claim 1 wherein said steel slug is heated to a temperature of approximately 200° F. and wherein the temperature of said blank during the punching operations does not exceed 600° F.

3. The process as defined in claim 1 including the step of turning the slug over between certain of the punch and die operations.

4. The invention as defined in claim 3 wherein said slug is pierced simultaneously with the further forming of the steel to conform it to the shape of the particular punch and die.

5. The process of forging an apertured steel blank which comprises heating a steel slug to a temperature between 150° F. to 400° F., subjecting said heated slug to a succession of punch and die operations between different combinations of punches and dies by which pressure is applied to cause steel to flow radially and axially in the direction of application of pressure between the punch and die, one of said operations including piercing the slug and causing the steel to flow radially in the die, and maintaining the temperature of said slug above 150° F. and below 650° F. during the punching operations, said steel being of the type not adversely affected during the punching operations.

6. The process as defined in claim 5 in which the steel slug is heated to an initial temperature of approximately 200° F., and the maximum temperature of the slug during the punching operations is maintained below 600° F., and including the step of subjecting the apertured slug to a further punching operation exerting radial pressure on the slug while confining it in a die so that the principal movement of the steel within the confined slug is axially of the movement of the punch.

References Cited in the file of this patent

UNITED STATES PATENTS

| | | |
|---|---|---|
| 1,671,484 | Pilling | May 29, 1928 |
| 1,832,168 | Wilcox | Nov. 17, 1931 |
| 2,080,850 | Frayer | May 18, 1937 |
| 2,621,344 | Friedman | Dec. 16, 1952 |
| 2,698,951 | Van Haandel | Jan. 11, 1955 |

OTHER REFERENCES

Mechanical Engineer's Handbook, by Liones S. Marks, 4th edition, page 588.